Aug. 27, 1935.  S. B. McKENZIE  2,012,398
HYDRAULIC CONTROL FOR AUTOMOBILE TRANSMISSIONS
Original Filed July 13, 1933  4 Sheets-Sheet 1
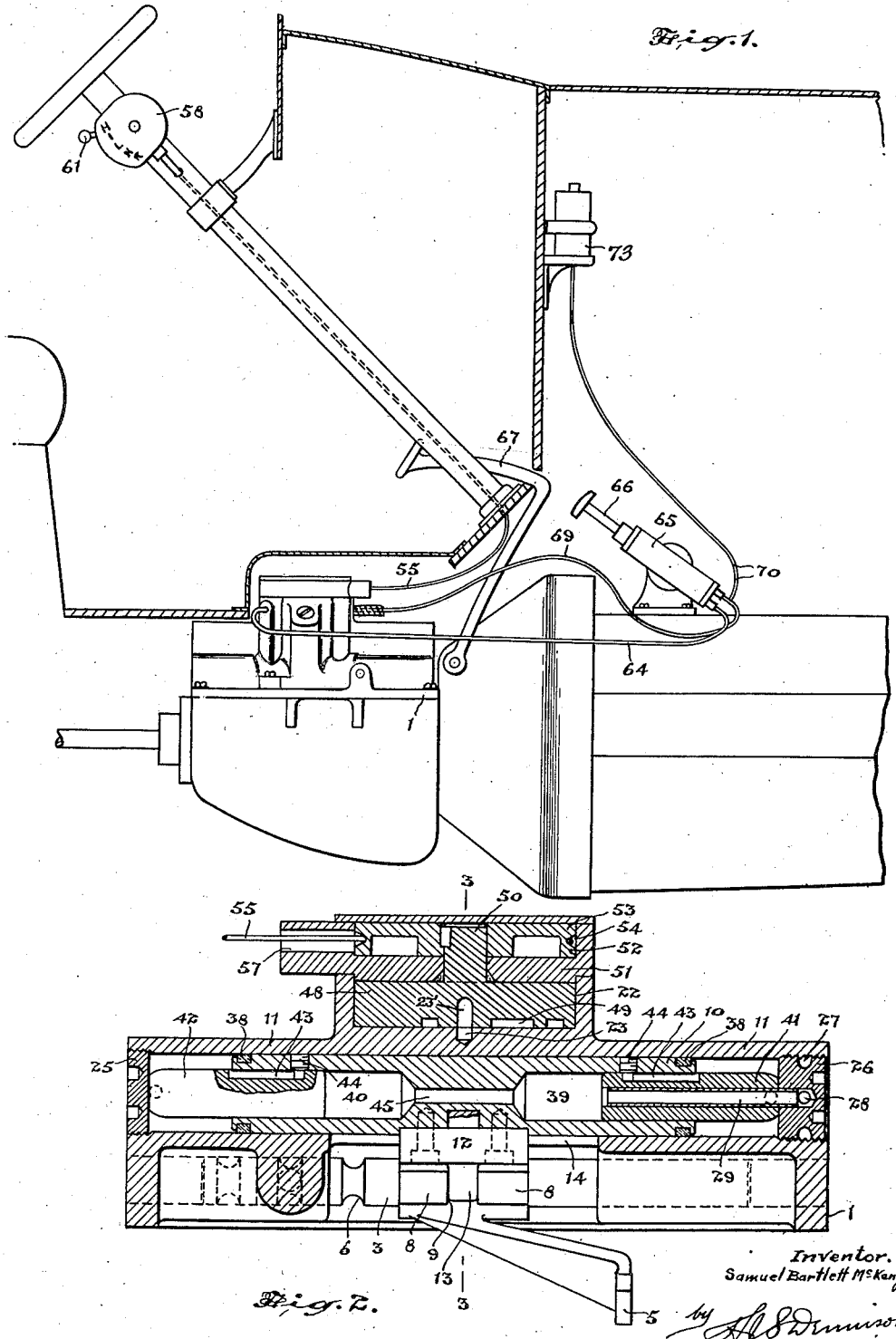

Aug. 27, 1935.　　　　S. B. McKENZIE　　　　2,012,398
HYDRAULIC CONTROL FOR AUTOMOBILE TRANSMISSIONS
Original Filed July 13, 1933　　4 Sheets-Sheet 2

Inventor.
Samuel Bartlett McKenzie

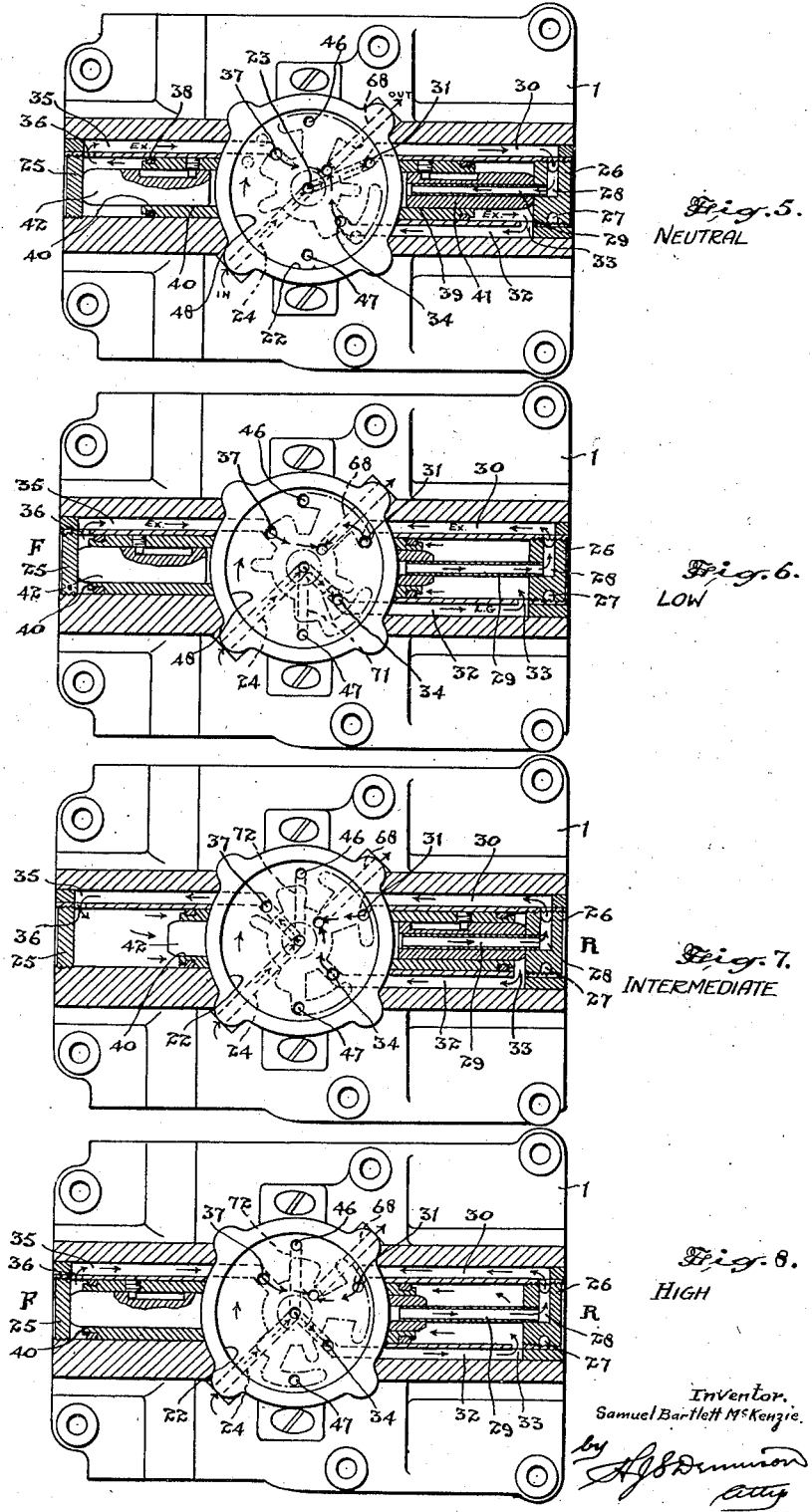

Aug. 27, 1935.  S. B. McKENZIE  2,012,398

HYDRAULIC CONTROL FOR AUTOMOBILE TRANSMISSIONS

Original Filed July 13, 1933  4 Sheets-Sheet 4

REVERSE

Inventor.
Samuel Bartlett McKenzie

Patented Aug. 27, 1935

2,012,398

UNITED STATES PATENT OFFICE 2,012,398

HYDRAULIC CONTROL FOR AUTOMOBILE TRANSMISSIONS

Samuel Bartlett McKenzie, London, England

Application July 13, 1933, Serial No. 680,199
Renewed May 14, 1935

9 Claims. (Cl. 60—52)

The principal objects of the invention are, to eliminate the uncertainties of the manual manipulation of gear shift levers, and to devise a gear shifting mechanism hydraulically operated which may be manually controlled in an extremely effective and dependable manner.

A further and important object is to provide a structure extremely simple in design which may be readily adapted to any design of gear shift mechanism and which may be attached to a gear shift in replacement of the ordinary gear shift lever.

A still further object of the invention is to devise a construction in which the operating parts are extremely simple and of a strong and rugged nature which will be very dependable in operation and which may be manufactured at low cost.

The principal features of the invention consist in the novel construction and arrangement of parts, whereby a fluid pressure is directed to a reciprocating member for effecting the shifting of the gears and to a pair of plunger members disposed transversely to the aforesaid gear shifting member by means of a rotatable valve which also controls the return flow of the operating fluid.

In the accompanying drawings Figure 1 is an elevational detail of the assembly of my improved gear shifting mechanism.

Figure 2 is an enlarged longitudinal mid-sectional view through the fluid pressure operating gear shifting device.

Figure 5 is a horizontal plan section through the plunger chamber showing the position of the parts therein with the gear set arranged in the "neutral" position, the valve chamber being shown in plan.

Figure 6 is a view similar to Figure 5 showing the position of the parts when set for "low" gear.

Figure 7 is a view similar to Figure 5 showing the parts set for "intermediate" gear.

Figure 8 is a view similar to Figure 5 showing the parts set for "high" gear.

Figure 3:
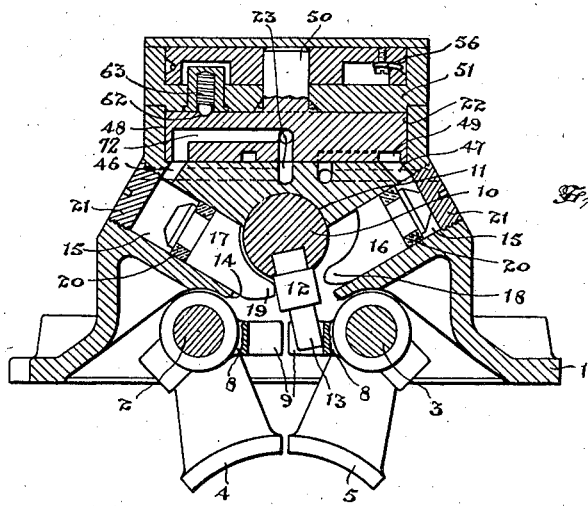
Figure 3 is a cross sectional view through the gear shifting device taken on the line 3—3 of Figure 2.
Figure 4:
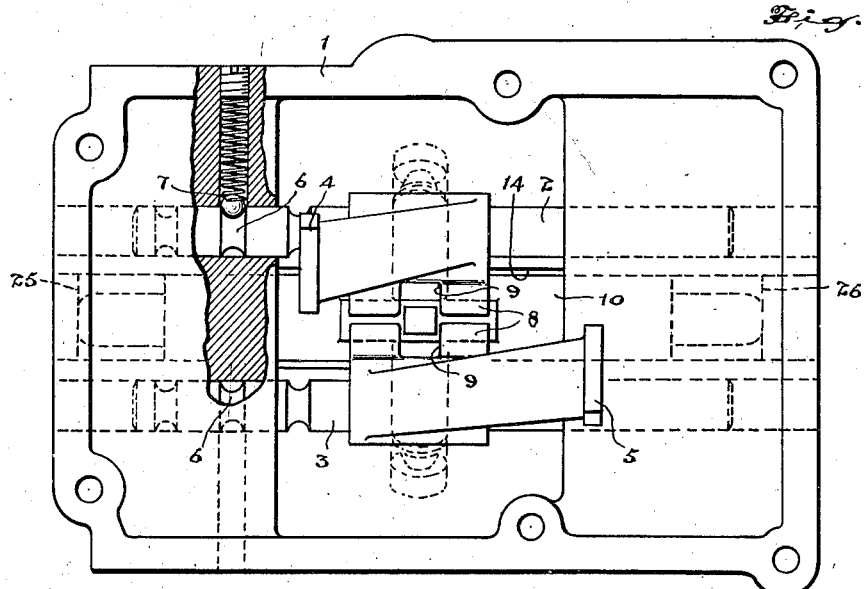
Figure 4 is an underside plan and part horizontal sectional view of the gear box cover.

In the construction of standard devices of change gear mechanism the gear box cover 1 is provided with a pair of spaced longitudinally slidable rods 2 and 3 which carry the gear shifting forks 4 and 5 respectively.

The rods 2 and 3 are provided with annular grooves 6 which are engaged by spring ball holding members 7 mounted in recesses in the cover.

Each of the fork members is provided with an inwardly extending and oppositely arranged flange 8 which is provided with a central notch 9.

Parallelly with and arranged above and centrally between the two rods 2 and 3 is a plunger 10 which is slidably mounted within a cylindrical bore 11 in the cover.

A block 12 is rigidly secured to the underside of the plunger 10 midway of its length and is provided with a finger 13 which extends into the notch 9 of either of the projecting flanges of the forks 4 and 5.

The plunger is free to rotate within its cylindrical bearing and the block 12 extends through a longitudinal slot or gap 14 in the underside portion thereof centrally of the length.

Cylindrical bores 15 extend in transverse directions centrally of the length of the gap and the inner ends of these bores intercept the plunger 10 in alignment with the block 12 when the finger portion 13 thereof is aligned with both of the notches 9, or otherwise the "neutral" position of the gear.

Within the bores 15 are mounted the short cylindrical blocks 16 and 17 respectively, the inner ends of which are concaved to form projecting fingers 18 and 19 respectively and extend under the plunger and engage the block 12.

Hydraulic washers 20 are mounted on the outer ends of the blocks 16 and 17 and the outer ends of the bores are closed by plugs 21.

When fluid pressure is applied to the outer ends of the bores 15, either of the cylindrical blocks is forced inwardly so that the finger ends will engage the block 12 of the plunger and rotate the plunger so that the finger 13 will be swung into one or other of the notches 9.

Centrally of the gear box cover 1 there is provided a circular countersunk recess 22 and in the centre of the bottom thereof there is formed a hole or port 23 which communicates with a passage 24 leading inwardly from the outside and 5 which forms the inlet passage for the pressure fluid which operates the device.

Each end of the bore 11 is closed, the slotted block 25 closing one end while the block 26 closes the other end. This latter block is formed with an annular passage 27 around its periphery intermediate of its ends which communicates through a radial opening 28 with a central hole at the inner side in which a tube 29 is secured.

A port 30 extends along one side of the bore 11 and communicates at the outer end with the annular passage 27 and the inner end 31 thereof extends upwardly to the face of the valve recess 22.

A passage 32 extends longitudinally alongside of the bore 11 at the side opposite to the passage 30 and has a port 33 at its outer end communicating with the interior of the bore and its inner end terminates in a port 34 in the face of the valve seat.

A passage 35 extends longitudinally alongside of the bore 11 at the opposite end thereof communicating with the end of the bore 11 through a port 36 and having a port 37 at the opposite end opening through the valve seat.

The plunger 10 is adapted to reciprocate within the bore 11 having suitable packing rings 38 at the ends and said plunger is bored inwardly from the ends forming a pair of cylinders 39 and 40.

Within the cylinders 39 and 40 are slidably arranged the plungers 41 and 42 which project from the ends of the cylinders 39 and 40 and extend to the end closure blocks 25 and 26.

Each of the inner plungers 41 and 42 is provided with a slot 43 which is engaged by a pin 44 extending through the wall of the main plunger. This pin limits the outward movement of the end plungers. The cylinders 39 and 40 are connected by a communicating passage 45.

The plunger 41 is bored centrally and is a sliding fit upon the tube 29 secured in the block 26 and the central opening therein forms a communicating passage for the flow of pressure fluid to the centre of the hollow plunger 10.

Ports 46 and 47 extend inwardly from the valve seat in diametrically opposite arrangement communicating with the outer ends of the angularly arranged transverse cylindrical bores 15 in which the blocks 16 and 17 operate.

A disc valve 48 is rotatably arranged in the countersunk recess 22 and engages the flat seat therein. This valve has arranged in its underside an exhaust cavity 49 which is adapted to communicate with the various ports to exhaust the pressure fluid from the different passages as required.

Figures 10, 11:
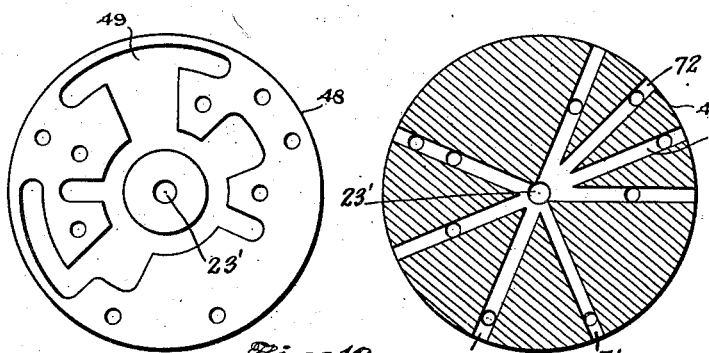
Figure 10 is an underside plan view of the control valve.
Figure 11 is a horizontal sectional view through the valve on the line of the distributing ports.
Figure 12:
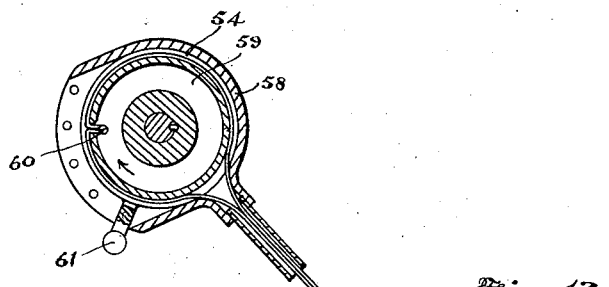
Figure 12 is a diagrammatic view illustrating the means for selectively operating the valve.
Figure 13:
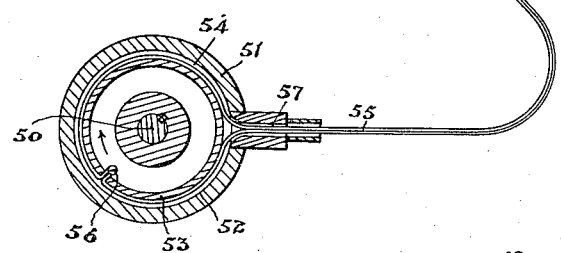
Figure 13 is a plan view of the valve showing the positioning indentations therein.

Various other ports are arranged in the under valve face and are connected by radial passages arranged centrally of the thickness of the valve as shown particularly in Figure 11 with the centre hole 23' connecting through the hole 23 with the inlet passage 24 so that the pressure fluid is instantly available to these ports in the valve face to direct a flow of pressure fluid into ports leading from the valve seat.

In Figures 5, 6, 7, 8 and 9 the ports in the valve seat appear and their connecting passages are indicated by dotted lines.

The exhaust cavity 49 is also indicated by dotted lines in its relative position for the various operations as will hereinafter be described.

The valve 48 is provided with a stem 50 which extends upwardly through the base of a circular member 51 closing the top of the valve recess 22 and said member is provided with a circular recess 52 in the top side in which is rotatably mounted a pulley member 53 provided with a peripheral groove 54.

An endless flexible wire 55 extends around the pulley 53 resting in the groove 54 and it is rigidly secured to the pulley at the point 56.

The wire after looping around the pulley extends out through a passage 57 in the cap member and is enclosed within a flexible shield in the form of a "Bowden" wire. This flexible cable is carried to a suitable position for manual control and is here shown extending into the steering column casing.

Upon the steering column is mounted a casing 58 and within this casing is journalled a grooved pulley 59 similar to the pulley 53.

The double "Bowden" wire is looped around this pulley and fastened securely at the point 60.

A lever extension 61 is secured to the pulley 59 and extends out through a slot in its enclosing casing. This lever is adapted to be operated by a driver of the vehicle. The various positions of the valve are indicated upon the lever casing 58 and the valve 48 is provided with indentations 62 in its upper face which are engaged by a spring plunger 63, which thus positions the valve with its ports in the several change gear operating positions.

A tube 64 is connected to the inlet passage 24 communicating with the central pressure feed hole 23 and leads to an oil pressure pump 65 which is rigidly mounted on the clutch casing of the engine in such a position that the plunger 66 thereof is engaged by the clutch pedal 67 when the pedal is depressed.

The depressing of the pedal forces oil under pressure through the tube 64 to the inlet passage 24 to be directed into the interior of the device to operate the main plunger 10 in accordance with the manipulation of the valve 48.

The oil contained in the plunger bore and communicating passages utilized in a previous operation is conducted from the exhaust cavity 49 through a passage 68 and tube 69 back to the pump.

A suitable check valve is arranged in the tube 64 to hold the pressure in said tube exerted by the plunger and a check valve is arranged at the end of the tube 69 connected with the pump permitting the exhaust oil to flow into the pump but preventing exit thereby.

A branch tube 70 connects with the tube 69 and leads to an oil reservoir 73 suitably located above the pump to supply any loss of oil that may occur through leakage.

In the operation of this device the driver by manipulating the lever 61 to the desired position for altering of the gear mechanism as indicated upon the casing 58 rotates the pulley therein operating the endless wire extending around the valve pulley 53 and the valve is thus turned to the position to direct the flow of oil under pressure through the required passages. For instance, when the operator moves the control lever to "neutral" the valve 48 is moved to the position indicated in Figure 5 so that the central hole 23 in the valve connected with the pressure inlet 24 is connected by means of one of the radial passages to the port 31, thus opening communication to the passage 30 and its communicating ports. Nothing transpires upon the change of the position of the valve but when the driver of the vehicle depresses the clutch pedal, thereby disconnecting the engine from the drive gear, the clutch pedal operates the oil pump 65 and oil under pressure is forced through the passage 24, hole 23, port 31, passage 30, annular passage 27 in the block 26, radial port 28 and tube 29 to the central chambers 39 and 40 in the main plunger 10.

The pressure thus applied immediately throws the plungers 41 and 42 outwardly to their extremities and in doing so the ends of the slots 43 therein engage the pins 44 to pull the main plunger to the neutral position.

The oil contained in the main bore 11 is discharged through either of the passages 32 or 35 in accordance with the direction of movement of the main plunger to the exhaust cavity 49 which is constantly connected by the passage 68 with the exhaust tube 69 returning the exhaust oil to the pump.

When the valve is moved to the position shown in Figure 6, which is for the operation of the change gear mechanism to "low" gear the central chambers 39 and 40 in the plunger 10 are connected through the passage 30 and port 31 to the exhaust cavity 49 in the valve and the port 34 is connected with the annular passage 24 by one of the radial passages in the valve to direct pressure oil through the passage 32 and port 33 to the main bore 11 and the pressure pushes the main plunger longitudinally to the limit of its movement toward the front end of the casing which is indicated by the letter F.

A pair of radial passages 71 are provided in the valve (see Figure 11) and one of these passages is indicated by the dotted lines 71 in Figure 6 communicating with the port 47 and the oil pressure flows from the port 23 and passage 71 through the port 47 into the cylinder bore 15 connected therewith.

The pressure exerted pushes the member 16 inwardly so that the finger 18 thereof engages the block 12 rotating the plunger 10 so that the finger 13 enters the notch 9 of the flange on the fork for operating the gears with the forward movement of the plunger into a low gear connection.

Simultaneously the port 37 connected with the end of the plunger bore opposite to that which the pressure bore enters and the port 46 connected with the other of the cylinder bores 15 are opened by the exhaust cavity 49 to permit the exhaust oil to escape therefrom due to the movement of the main plunger and the block 17.

When the operator desires to change to intermediate gear the lever 61 is shifted to the desired position operating the valve to the position indicated in Figure 7 and the flow of pressure oil is directed through the port 37, passage 35 and port 36 to the left hand of the cylinder bore. The port 46 is connected by the radial passage 72 indicated in dotted lines with the pressure fluid and the cylinder block 17 is operated to engage the block 12 of the plunger to rotate it so that the finger 13 will engage the notch 9 of the flange of the fork for operating the gears to the intermediate position. When this connection has been made the oil entering the end of the plunger bore forces the plunger to the rear end marked "R".

The introduction of fluid pressure to the longitudinal shift cylinder is preferably effected simultaneously with the introduction of pressure to either of the transversely disposed cylinders 15, but it will be appreciated that the main plunger 10, being more sluggish in its movement and due to the resistance offered by the spring pressed detents 7, will cause the pressure to first displace the plunger 16 or 17 in the cylinders 15 provided they are at the outward end of the cylinder when pressure is admitted, with the result that the plunger will first be urged to rotate under the influence of either plunger 16 or 17 so that the main plunger extension will be caused to enter either one or the other of the flange notches 9, and when the maximum movement of the plunger 16 or 17 has been effected the only relief now for the applied fluid pressure is by forcing the main plunger longitudinally so that the longitudinal shift is effected.

When it is desired to shift to "high" gear the valve is operated through the lever 61 so that the ports 31 and 37 are connected with the exhaust cavity 49. The port 46 remains in communication through one of a series of valve passages 72 with the pressure fluid and the port 34 is connected to the pressure fluid allowing the pressure to flow through the passage 32 and port 33 to the rear end of the cylinder bore. The plunger is thus forced to the front end marked "F" and the change gear fork for shifting gears to "high" is carried with it.

Figure 9:
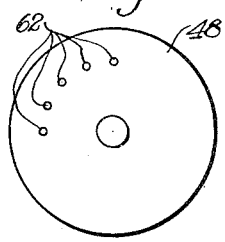
Figure 9 is a view similar to Figure 5 showing the parts set for "reverse" gear.

In Figure 9 the position of the ports and the flow of the fluid is indicated for moving the plunger in the opposite direction to that shown in Figure 6, that is, the port 47 is connected to the pressure fluid to operate the gate finger in the manner described, while the port 46 is opened to the exhaust along with the port 34, while the port 37 is opened to the rear end of its bore.

The operation is extremely simple, the double "Bowden" wire operating the valve very positively in either direction of rotation effected by the manipulation of the lever 61. The operator has ample time to set the control lever in whatever position may be desired for the next change of gear, while the car is still moving if such setting is desired, but the actuation of the gear change does not take place until the driving mechanism has been disconnected from the power through the operation of the clutch pedal and the action of the change gear is instantaneous upon the movement of the clutch pedal to the downward limit of its stroke.

With this arrangement of device it will be seen that the driver of a vehicle may while approaching a stop, shift the lever 61 to the "low" position if it is the intention to proceed immediately following the stop. Then as the car is brought to a stop the clutch is depressed and the gear change is instantaneously effected so that the car may proceed at once in low gear following the resumption of traffic.

While the car is accelerating its speed in low gear the operator shifts the lever 61 to the "intermediate" position and by simply depressing the clutch the shift is made and the speed is increased and while the car is still accelerating the control lever shifts to the "high" position and when the car has attained the desired speed for the change of gear to be effected, it is simply necessary to depress the clutch and the change is made.

The parts are rugged and of a simple and inexpensive construction and are entirely embodied in the gear case covered structure, that is, with the exception of the control lever and pump, which must of course be properly located and which are connected with the gear shift operating portion by flexible connections.

This construction not only provides for a ready assembled installation, but permits of its adaptation to cars already in use where a change from the hand lever shift is desired. It is merely necessary to provide gear case covers equipped as described to fit the gear case model to which the device is to be applied.

What I claim as my invention is:—

1. A hydraulic selective shift control for automobile transmission, comprising a plunger having an extension adapted to engage the transmission mechanism, pressure fluid operating means for rotating said plunger to selectively shift said extension about the plunger axis, means for directing fluid pressure to either end of said plunger to selectively shift the same longitudinally, and fluid pressure operated means within said plunger for returning same to "neutral" position.

2. A hydraulic selective shift control for automobile transmission, comprising a plunger having an extension adapted to engage the transmission mechanism, pressure fluid operating means for rotating said plunger to selectively shift said extension about the plunger axis, means for directing fluid pressure to either end of said plunger to selectively shift the same longitudinally, plungers mounted within the aforesaid plunger to extend beyond the ends thereof, means for directing fluid pressure into said main plunger between the end plungers carried thereby, and means connected with the end plungers engaging the main plungers to effect its return to neutral position.

3. In a hydraulic selective shift control for automobile transmission, a cover plate having a longitudinal cylindrical bore and an opening centrally of said bore, a main plunger slidably arranged in said bore and having a rigid extension projecting through the said opening and adapted to selectively engage the transmission mechanism, hydraulically operated plungers mounted transversely of said cover plate either side of said main plunger and adapted to engage the extension thereof and to turn the plunger to swing the extension member selectively, hydraulically controlled means for positively returning said main plunger to a neutral position, passages leading to the ends of the cylindrical bore, a valve operable to direct a fluid pressure selectively to either of said transverse plungers and selectively to either end of said main plunger bore, and means for forcing a fluid pressure through the passages directed by said valve to operate said plungers.

4. A hydraulic selective shift control for automobile transmission as claimed in claim 3 having a circular valve seat with ports connected to the passages to the ends of the main plunger cylinder and said transverse plunger bores, a rotary valve engaging said seat having an exhaust cavity formed to selectively connect with the ports in the valve seat and a plurality of ports connected to a common fluid pressure supply adapted to register selectively with the ports in the valve seat, manually controlled means for rotating said valve, and means for instantaneously directing a flow of pressure fluid to the inlet ports opened by the valve.

5. A hydraulic selective shift control for automobile transmission as claimed in claim 3 having a circular valve seat with ports connected to the passages to the ends of the main plunger cylinder and said transverse plunger bores, a rotary valve engaging said seat having an exhaust cavity formed to selectively connect with the ports in the valve seat and a plurality of ports connected to a common fluid pressure supply adapted to register selectively with the ports in the valve seat, a grooved pulley operatively connected to rotate said valve, a grooved pulley having a manually controlled lever connected thereto and a double "Bowden" wire encircling each of said pulleys and extending therebetween and conveying from the manually operated pulley the exact movement thereof to the valve pulley.

6. A hydraulic selective shift control for automobile transmission, as claimed in claim 3 having a circular valve seat with ports connected to the passages to the ends of the main plunger cylinder and said transverse plunger bores, a rotary valve engaging said seat having an exhaust cavity formed to selectively connect with the ports in the valve seat and a plurality of ports connected to a common fluid pressure supply adapted to register selectively with the ports in the valse seat, manually controlled means for rotating said valve, means for instantaneously directing a flow of pressure fluid to the inlet ports opened by the valve, and spring plunger means for positively locating the valve with its ports coinciding with the ports in the valve seat upon the manual operation of the valve.

7. In a hydraulic selective shift control for automobile transmission, a cover plate having a cylindrical bore, a valve seat arranged in said cover plate, passages leading from each end of said cylinder bore, a passage leading from said valve seat to a point centrally of one end of the cylinder bore, a tube extending inwardly forming a continuation of the passages leading to the centre of said cylinder bore, a plunger reciprocably mounted within the cylinder bore and having cylindrical bores in each end connected centrally, a plunger mounted in each of the bore ends of the main plunger and adapted to project outwardly therefrom to engage the cylinder ends, one of said plungers having a central bore receiving said tube, slots extending longitudinally of the periphery of each of the inner plungers, pins secured in the main plunger extending into each of said slots to effect the return of the main plunger to neutral position through the operation of the end plungers operating therein, a valve operating on said valve seat to control the opening and closing of the ports leading to the passages in said cover plate, means for manually controlling said valve, and means for directing a fluid pressure controlled by said valve to said passages.

8. A hydraulic selective shift control for automobile transmission, comprising an attachment cover plate having a longitudinal cylinder bore, said cylinder having an opening in the underside centrally thereof, a plunger operating in said cylinder bore having a rigid finger extension projecting through the said opening, a pair of cylinders oppositely arranged on either side of said central bore and midway of the length thereof, a plunger operating in each of said transverse cylinders having a finger extension to engage the finger extension of the longitudinal plunger and to hold said finger extension in its assumed position throughout its longitudinal movement, said transverse plungers being easily displaceable compared to said longitudinal plunger whereby on the simultaneous application of fluid pressure to the longitudinal and transverse plungers the transverse plunger will be operated prior to the operation of the longitudinal plunger, means for directing fluid pressure selectively to said transverse plungers, means for simultaneously directing fluid pressure to either end of the main longitudinal plunger, means for directing the exhaust fluid from the plunger cylinders, and means manually operable for selectively controlling the direction of flow of said fluid pressure.

9. In a hydraulic selective shift for automobile transmission, a main base plate having a pair of shift rods slidably mounted side by side therein, and having a longitudinal bore closely paralleling said shift rods and disposed in a plane intermediately thereof, a single longitudinal shift plunger in said bore, having a lateral extension and being rotatable in said bore to operatively engage the extension with either rod, fluid pressure displacement means selectively rotating said plunger in said bore to engage the extension with either of said shift rods, and control means selectively directing fluid pressure to and from said plunger and fluid pressure displacement means to effect the sliding and rotation of said plunger and the direct variable shifting of said rods.

SAMUEL BARTLETT McKENZIE.